July 24, 1962  J. J. J. STAUNTON  3,045,532
DIFFRACTION GRATING HAVING A PLURALITY OF BLAZE ANGLES
Filed May 19, 1958
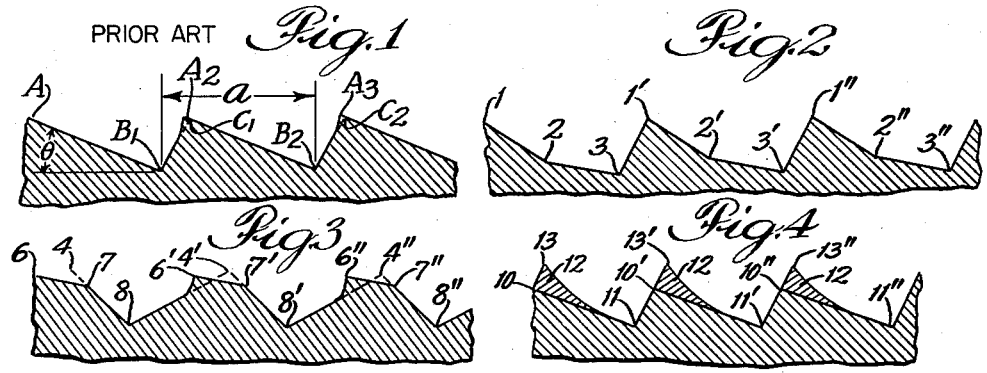
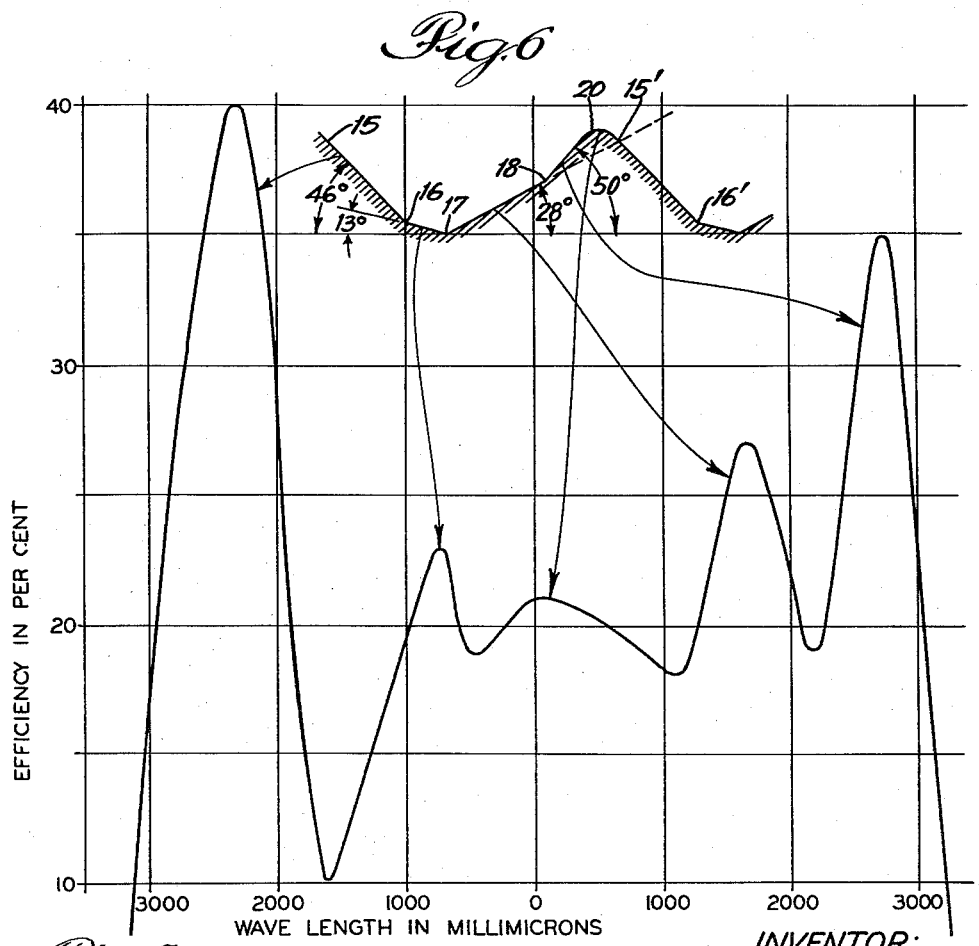
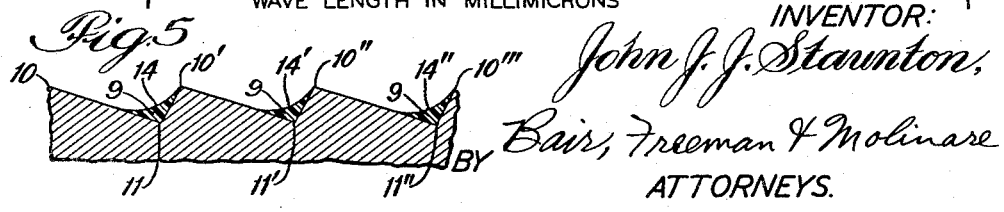
INVENTOR:
John J. J. Staunton,
Bair, Freeman & Molinare
BY ATTORNEYS.

United States Patent Office 3,045,532
Patented July 24, 1962

---

3,045,532
DIFFRACTION GRATING HAVING A PLURALITY OF BLAZE ANGLES
John J. J. Staunton, Oak Park, Ill., assignor to Coleman Instruments, Inc., Maywood, Ill., a corporation of Delaware
Filed May 19, 1958, Ser. No. 736,365
7 Claims. (Cl. 88—14)

This invention relates to an improved construction in diffraction gratings and more particularly to echelette gratings characterized by operability over a wide range of wave lengths.

Diffraction gratings, as is well known, are used in place of prisms to disperse white light into its component colors. Diffraction gratings consist of a series of very fine, closely spaced, parallel slits or of very narrow parallel reflecting surfaces which, when light is incident upon them at a definit angle, produce a succession of spectra. The gratings find wide use in scientific instruments such as spectroscopes and spectrophotometers. A diffraction grating is preferable to a prism for dispersing monochromatic light because the spectra it forms are spread out so that the adjacent wave lengths are farther apart and may be optically resolved with more certainty. Also, the grating separates the wave length evenly to produce a normal spectrum as distinguished from the abnormal spectrum of a prism where the blue region may be spread out and the red crowded together.

Simple gratings are inefficient because the light beam is not concentrated in one spectrum. This led to the development of the echelette grating in which the lines or grooves in the surface thereof are ruled by a diamond accurately cut to an angle of, say, 105° and inclined during ruling so that one side of the groove is inclined at a shallow angle and the other side at a steep angle. Thus, in cross section the groove resembles a V, one face of which is considerably shorter than the other. The number of grooves may range from a few hundred to 100,000 per inch, depending upon the use to which the grating is put, the coarser gratings being used mostly in the long wave length infra-red. A grating suitable for the near ultra-violet, visible, and near infra-red typically may have 15,000 lines per inch. Each of these lines or grooves must be parallel to the others to within less than a millionth of an inch or the grating will not give sharp, accurate spectra. The accuracy of the spacing must be equally precise or false spectra will appear, adversely affecting the function of the grating. The grooves must all have an identical shape within very close limits. In a reflection-type echelette grating the narrow parallel grooves constitute a series of strip mirrors which direct the light to a particular spectrum, depending upon the angle of the groove, thus producing maximum intensity in that spectrum, which is known as the "blaze." Ordinarily the blaze is effective over approximately one octave (factor of 2X) of wave length, for example from 200 to 400 millimicrons or from 300 to 600 millimicrons, and so forth.

In scientific instruments which require a range of wave lengths broader than one octave, either the efficiency must be greatly reduced or provision must be made for accommodating interchangeable gratings. In the former case one must use the very low intensity light in the areas lying outside the concentrated blaze, which, of course, is very unsatisfactory because of loss of accuracy of the instrument. In the latter case different diffraction gratings are used for the different wave length ranges desired, each grating having grooves cut at the angle which provides a blaze at the desired wave length. Obviously an instrument which provides for accurate mounting of replaceable gratings is more costly to manufacture and more cumbersome to use.

The primary object of the present invention is to obviate the foregoing difficulties and provide an improved diffraction grating which is reasonably efficient over a wide range of wave lengths. This is accomplished in accordance with the invention by shaping the grooves to spread the blaze over the desired region.

In a preferred form of the invention an echelette grating having conventional V-shaped grooves in the surface is modified so that the long, shallow side or working face of the V is divided into a plurality of individual parallel planes extending longitudinally of the groove. This causes the blaze to be spread over the desired region of the spectra rather than being concentrated in a narrow wave length range, and without undue loss in intensity.

The invention is also directed to a preferred method for forming grooves comprising a plurality of different planes. Other objectives and advantages of this invention will become apparent from the following description when read in connection with the accompanying drawings, wherein:

FIGURE 1 is a transverse sectional view through the surface layer of a conventional (prior art) echelette diffraction grating having a single blaze angle $\theta$;

FIGURE 2 is a similar view of an echelette diffraction grating constructed in accordance with the invention and having a plurality of blaze angles;

FIGURE 3 is a similar view of another construction of the invention wherein the working faces of the grooves are divided into a plurality of planes forming a convex surface;

FIGURES 4 and 5 are views of a grating similar to FIGURE 1 wherein the working surface has been modified to concave, curved configuration; and FIGURE 6 is a sectional view through a composite diffraction grating, each side of which has been divided by a different method, and includes a graph showing the efficiency of the extended blaze produced by the plurality of planes in the working surfaces. In the graph the efficiency is plotted against wave length.

Reference to FIGURE 1 will indicate the surface configuration of a conventional echelette where the points $A_1B_1C_1$ define the shape of the initial groove formed on the surface of the plate. Identical groove $A_2B_2C_2$ lies adjacent the first groove, which in turn is followed by thousands of others all spaced apart the distance "$a$," and of identical configuration. Usually the surface consists of a thin, uniform layer of aluminum vapor-deposited on a flat glass plate. The drawing illustrates only a small section of the aluminum layer. In ruling the surface the groove to the left is formed first. The diamond tool then forms the second groove $A_2B_2C_2$, and during this operation the wall $B_1C_1$ is modified slightly to the shape indicated by $B_1A_2$. In other words, a small burr is formed at the top of the ridge during the formation of the first groove which is pushed aside to the position shown in the drawing as the second groove is formed. The inclined faces $A_1B_1$, $A_2B_2$, etc., are the working faces of the groove. The angle $\theta$ in FIGURE 1 is the blaze angle and the peak of the blaze will lie at a wave length calculated from the following grating formula:

$$n\lambda = a \sin \theta$$

where "$a$" is the distance between the grooves, as indicated in FIGURE 1, and "$n$" is the order of the spectrum. The peak reflection efficiency at wave length $\lambda$ may be as high as 80%.

In order to spread the blaze, the surfaces $A_1B_1$, $A_2B_2$ of the grooves are altered in accordance with this invention so that $\theta$ assumes a range of values covering the desired wave length range. This may be done by breaking the surface $A_1B_1$ into a plurality of individual planes or into a curved surface which may be convex or concave. Various configurations of grooves constructed so as to provide a broad range of blaze angles are shown in FIGURES 2 through 6. In each case the intensity distribution of the light among the spectral orders of the grating is modified to insure sufficient intensity over the desired spectral range.

FIGURE 2 shows a groove similar to the groove of FIGURE 1 except that the working surface has been broken into two distinct and individual planes 1—2 and 2—3. The planes form a shallow depression in the working face. Comparable points in adjacent identical grooves are identified by the same numbers with primes affixed. The planes 1—2 and 2—3 provide two different blaze angles. In a typical grating the ruling may, for example, be about 15,000 lines per inch and the blaze may be spread over a range of from 200 to 3,000 millimicrons. The spacing of the grooves still determines the angular separation of the spectral orders. A conventional echelette of the type shown in FIGURE 1 could be made to peak in this range but would not cover the entire range satisfactorily because if it were peaked at either end of the range the efficiency at the other end would be low, or if it were peaked at the middle of the range the peak would be where it was least needed and both ends would be very inefficient—well under 5%. Throughout this specification and in the claims "efficiency" is the ratio of transmitted or reflected light to incident light of the same wave length expressed in percent. The groove configuration of FIGURE 2 will provide two peaks which can be adjusted to fall a suitable distance from each end of the desired range, leaving a shallow valley in the middle of the range where it is not objectionable.

The configuration of FIGURE 2 can be obtained practically with a conventional diamond cutting tool in a single pass on a ruling engine. Instead of the movement of the tool proceeding (with respect to the surface) from left to right of FIGURE 2, the ruling proceeds from right to left. Thus, the previously ruled groove, for example 1″—2″—3″, is deformed at the ridge between the grooves into the desired configuration during the cutting of groove 1′—2′—3′. By proceeding with the cutting of the grooves in this manner the ruling is accomplished in one pass per groove. Each stroke is the second pass for the preceding stroke.

In FIGURE 3 the working surface has been broken into two planes which project convexly or are peaked in cross section. The ruling is done in two cuts of the tool, the first cut forming the V-shaped grooves 4—8—4′, 4′—8′—4″, etc. The second cut is taken across the apex of the projection between the valleys to form the new surfaces 6—7, 6′—7′. During the formation of this surface the upper portion of the face 8—4′, 8′—4″ is turned over to form a surface which is slightly curved at the top, indicated at 8—6′ or 8′—6″, etc. It is more difficult to form a groove of this type than those which are made with a single pass of the diamond tool because of the phasing problem. The angle of the tool must be changed and the phase and the loading readjusted. To bring the tool into precise alignment with the peaks 4—4′ for the second cut is a difficult undertaking, especially where the grooves are very close together.

In FIGURE 4 I have shown a groove configuration wherein the working face is divided into an indefinite number of different plane surfaces arranged at different angles, thus forming a concavely curved surface. This configuration may be produced by evaporating aluminum or other metal as the grating is rotated with respect to the metal source to build up metal near the top of the groove and thus form a concavely curved surface. In the drawing the original cut groove is designated by the numerals 10—11—10′, 10′—11′—10″, etc. The built-up metal 12 forms the concave curved surfaces 13—11, 13′—11′, 13″—11″, which are substantially equivalent to a distinct multiplane groove and produce a specific predetermined blaze angle.

Another method for forming a concave curved working surface is illustrated in FIGURE 5. Here the original grooves identified as 10—11—10′, 10′—11′—10″, etc. may be partially filled in with gelatin or an epoxy or polyester resin 9 which may be cast on the surface in liquid form and later caused to solidify. The solidified deposit forms the concave surface 14—14′, etc. The gelatin or resin should be prepared with a wetting agent to reduce the surface tension so that it will flow down into the bottom of the V.

FIGURE 6 shows a single groove in which the left-hand working face is broken into two planes and the right side has been deformed upwardly from the original plane to form a ridge, thus dividing the right side into two planes. This is for the purpose of illustrating two methods of grooving and the type of blaze obtained by each. It will be understood that in practice only the right or the left face is modified, not both. In cutting the left-hand groove illustrated in FIGURE 6 the diamond may be advanced from right to left with respect to the aluminum surface of the grating. This breaks the surface into two planes 15—16 and 16—17. The right side is flat, as indicated by the line between the points 17 and 15′.

If it is desired to produce the break in the right face, the grooves are ruled from left to right with a diamond having a flat left side. The pressure imposed on the face 17—15′ near the top thereof during the cutting of the next groove to the right causes the surface metal to be pushed above the plane of the dotted line into the rounded ridge 20. Thus, the right side of the groove is altered to form two planes 17—18 and 18—20 which further extend the blaze. The curve below the configuration of the grooves in FIGURE 6 shows the percent efficiency of the grooves plotted along the ordinate against different wave lengths plotted along the abscissa. Arrows in the drawing indicate the peaks in the curve that correspond to each of the planes in the right- and left-hand grooves. The angles of each plane are also specified in the drawing to illustrate in detail typical groove configurations produced in accordance with the invention. It will be noted that the efficiency averages about 25% for either groove. The left groove has two peaks of about 23% and 40% near the ends of the spectral range with a central depression of 10%. The right groove has three peaks at 21, 27 and 35% efficiency extending over the 3,000 millimicron range. It should also be mentioned that the transition between the different angles of the planes forming the grooves is not sharp but gradual; hence the peaks of the blaze are broad and the efficiency does not drop to low values between the peaks.

Heretofore I have discussed the various methods of producing echelette gratings, referred to in the art as "masters." These are made from glass or metal-coated glass or other suitable rigid material which is relatively stable. The gratings of industry are made from these masters by casting a liquid gelatin or a synthetic resin on the surface of the master to produce an exact image thereof. The liquid hardens and is stripped from the master. These commercial gratings are called "replicas." Being exact duplicates of the masters, they perform in exactly the same way and may be used substantially interchangeably with the masters. The masters obviously are very expensive to make and are utilized primarily in producing the replicas. The invention is directed to any gratings as defined in the appended claims, whether produced as an original or as a replica.

From the foregoing it will be apparent that there are a number of advantages accruing from the grating of the invention:

(1) Wide usable wave length range;
(2) Necessity of using interchangeable gratings peaked at different wave lengths eliminated;
(3) Uniformity over the face of the grating produces no distortion of the optical beam shape; and
(4) By variation of the diamond angle and the weight applied thereto during ruling, a wide variety of groove shapes can be formed with a single standard diamond shape.

Other modifications of the invention will occur to those skilled in the art and it is not my intention to limit the invention to the forms shown and described other than as necessitated by the scope of the appended claims.

I claim as my invention:

1. A diffraction grating characterized by a wide usable range in wave length, having a multiplicity of identical equally-spaced parallel grooves, each groove having a shallow depressed working surface broken into a plurality of individual distinct planes inclined toward each other and parallel with the axes of the grooves to provide a plurality of predetermined blaze angles.

2. A diffraction grating characterized by a wide usable range in wave length, having a multiplicity of identical equally-spaced V-shaped grooves, in which one face is wider than the other, said one face being slightly depressed and broken into a plurality of planes inclined toward each other and parallel with the axes of the grooves to provide a plurality of predetermined blaze angles.

3. A diffraction grating characterized by a wide usable range in wave length, having a multiplicity of identical equally-spaced parallel grooves, in which one face is wider than the other, said one face having a curved surface equivalent to an infinite number of different planes arranged at different angles with respect to each other and parallel with the axes of the grooves, to provide a plurality of predetermined blaze angles.

4. A diffraction grating characterized by a wide usable range in wave length, having a multiplicity of identical equally-spaced V-shaped grooves, in which one face is wider than the other, said one face being peaked in cross section and broken into a plurality of planes inclined toward each other and parallel with the axes of the grooves to provide a plurality of predetermined blaze angles.

5. An echelette diffraction grating having a multiplicity of identical equally-spaced parallel grooves in the surface thereof, one side of each of which is formed by a plurality of adjoining parallel planes parallel with the axes of the grooves, each of said planes being disposed at an obtuse angle to adjacent planes of said grooves.

6. An echelette diffraction grating characterized by maximum efficiency over a range of wave lengths up to approximately 3,000 millimicrons comprising a base having from 300 to 15,000 identical parallel grooves per inch in the surface thereof, one side of each of said grooves having at least two plane surfaces joined at obtuse angles, whereby the peaks of light intensity are minimized and the valleys of light intensity maximized to spread the blaze of the grating over said range of wave lengths.

7. A diffraction grating characterized by a wide usable range in wave length, having a multiplicity of identical equally spaced parallel grooves, each groove having a convexly shaped working surface broken into a plurality of individual distinct planes inclined toward each other and parallel with the axes of the grooves to provide a plurality of predetermined blaze angles.

References Cited in the file of this patent

UNITED STATES PATENTS

| | | |
|---|---|---|
| 818,966 | Ives | Apr. 24, 1906 |
| 1,744,642 | Kondo | Jan. 21, 1930 |
| 2,463,280 | Kaehni et al. | Mar. 1, 1949 |
| 2,464,738 | White et al. | Mar. 15, 1949 |

OTHER REFERENCES

"Spectral Intensity and Groove Form of the Diffraction Grating," Rosenthal Journal of the Optical Society of America, vol. 20, No. 3, 1930, pages 87–96.

Modern Interferometers, Candler, published by Hilges & Watts, Ltd., 1951, pages 382–388.